Jan. 26, 1932.　　　　E. WILKINSON　　　　1,842,705

RELEASING SPEAR

Filed June 8, 1931

Inventor
Ernest Wilkinson

Patented Jan. 26, 1932

1,842,705

UNITED STATES PATENT OFFICE

ERNEST WILKINSON, OF SOUR LAKE, TEXAS, ASSIGNOR TO LESLIE A. LAYNE, OF HOUSTON, TEXAS

RELEASING SPEAR

Application filed June 8, 1931. Serial No. 542,812.

My invention relates to pipe gripping devices adapted to be employed in removing pipe from wells. These devices are ordinarily called spears and this particular type of spear is called the bulldog spear.

It is an object of the invention to provide a device adapted to operate in a simple and positive manner to grip within a pipe to be pulled and which may, if desired, be released from the pipe and withdrawn from the well.

It is another object to provide a spear which may be operated to move the pipe gripping jaws positively into position away from the pipe so as to prevent any possibility of its engaging the pipe when it is withdrawn from the well.

The invention resides in the simple construction of the device whereby it may be reliable in use and economical to manufacture.

In the drawings herewith Fig. 1 is a central longitudinal section through a spear constructed in accordance with my invention, the same being shown within a pipe and moved into pipe engaging position.

Figures 1, 2, 3:
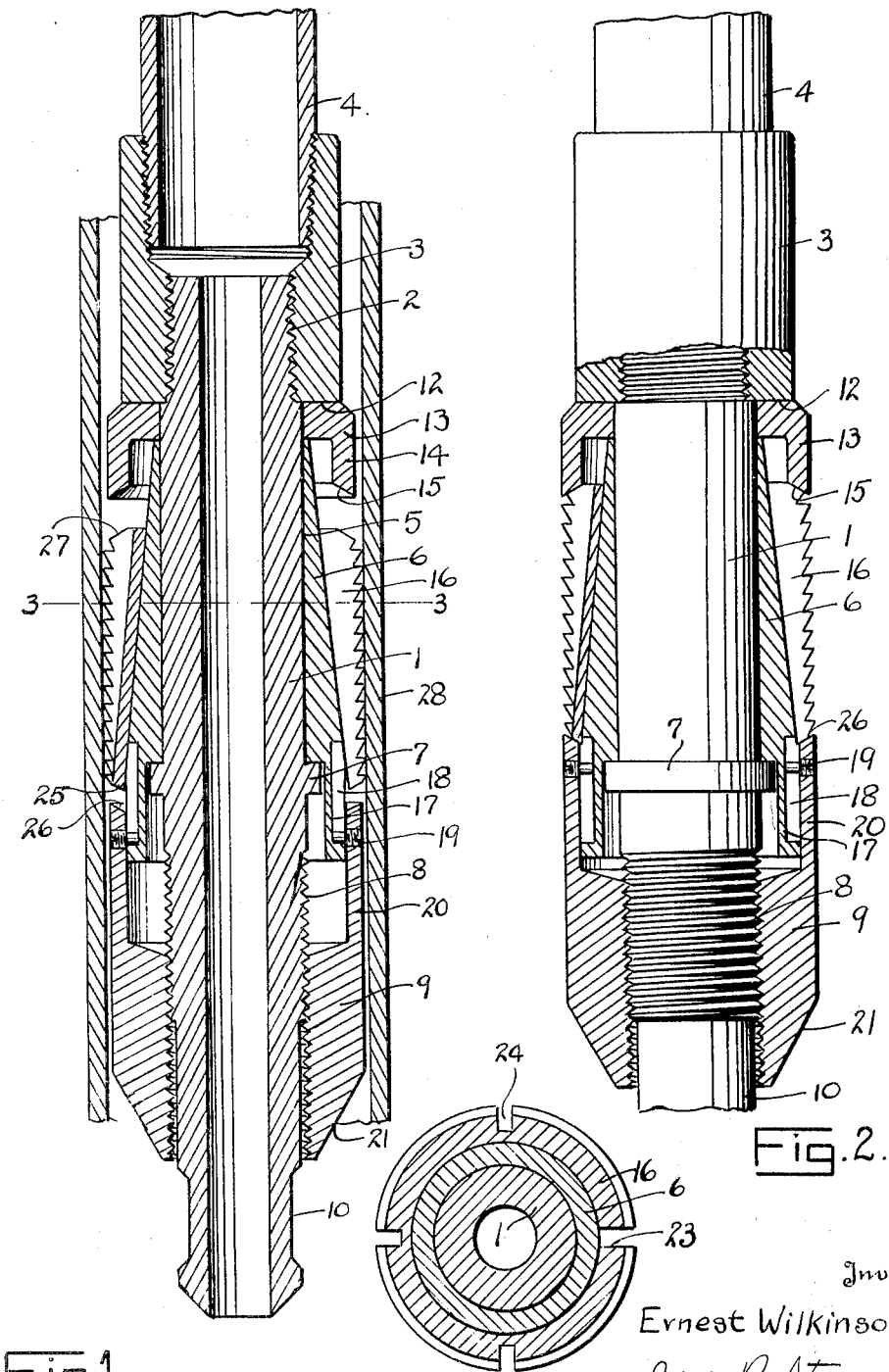
Fig. 2 is a side view partly in central vertical section showing the jaws in inoperative position released from the pipe.
Fig. 3 is a transverse section taken on the plane 3—3 of Fig. 1.

In constructing my spear I employ a central tubular mandrel 1 threaded on the exterior on its upper end at 2 for engagement by means of a special coupling 3 with a pipe or drill stem 4 which may be understood as extending upwardly to the surface. The mandrel is cylindrical below the threaded portion 2 for a distance to provide a seat 5 for the expanding cone 6. Below this cylindrical area is a radial flange 7 adapted to limit the downward movement of the expanding cone.

Spaced somewhat below the flange 7 the outer surface of the mandrel is threaded at 8 to engage an elongated nut 9. The mandrel extends below the threaded area and may be made polygonal at 10 to receive a wrench whereby the parts may be assembled.

The coupling 3 has a wide shoulder 12 at its lower end against which is fixed a clamping ring 13. Said ring has a downwardly extending outer flange 14 thereon which is beveled at 15 to engage the upper end of the pipe gripping jaws 16.

The ring 13 is clamped between the upper end of the conical expanding sleeve 6 and held rigidly in that position. The said expanding cone rests upon the upper end of the flange 7 and has an outer skirt 17 which extends down below the flange for a short distance. Said expanding cone has a plurality of vertical grooves or recesses 18 therein forming a key way to receive the inner ends of screws 19 acting as keys within said key way to prevent relative rotation of the expanding cone and the nut 9 through which the screws 19 extend.

The nut 9 is threaded upon the area 8 upon the mandrel and has an upwardly extending ring or flange 20 of sufficient inner diameter to engage about the lower skirt 17 upon the expanding cone. The lower end of the nut is beveled at 21 to form a guide shoe while the device is being inserted into the well.

The jaws 6 will be understood best from Fig. 3. They are formed upon a sleeve or ring entirely surrounding the mandrel. The said sleeve is split longitudinally at 23 to allow expansion of the jaws upon the expanding cone. There are also longitudinal grooves 24 dividing the slip into four separate pipe gripping jaws which are toothed on their outer surface to engage the pipe. The inner surface of the slip is tapered upwardly to engage over the outer surface of the expanding cone. It is to be noted that the lower end of the slip is tapered at 25 to engage the downwardly tapered recess 26 in the upper end of the nut 9. The upper end of the slip is tapered at 27 to engage with the lower seat 15 of the clamping ring.

In the operation of this device the device is assembled as shown in Fig. 1 with the jaws loosely movable along the expanding cone. When the device is moved downwardly in the well any engagement of the slip with the outer pipe shown at 28 will move the jaws upwardly on the expanding cone and no gripping of the pipe will result. When the tool is at the proper position in the pipe to be removed it will be moved upwardly and the jaws will automatically seize the pipe and be wedged in gripping position by the relative upward movement of the expanding cone. When the pipe has been properly gripped it may be removed from the well.

If it should be found that the pipe is fixed in the well and cannot be pulled, the tool may then be released. This is done by lowering slightly on the mandrel and rotating in a right hand direction. This will screw the mandrel downwardly relative to the nut 9 which is held in fixed position by the gripping action of the jaws 6 against the expanding cone which is held in turn non-rotatable relative to the nut by means of the said screws 19.

When the nut 9 is advanced upwardly relative to the mandrel it will engage the lower ends of the jaws 16 and said jaws may then be moved upwardly into engagement with the shoulder 15 where they will be clamped in contracted position allowing the tool to be withdrawn from the well.

The advantage of this construction lies in the fact that it is of simple and strong construction. The pull exerted by the mandrel upon the jaws is sustained by the radial flange 7 and there is no tendency to distort the threaded portion 8 and thus prevent the successful operation of the releasing device. This makes the tool a reliable one and subject to rough use without getting out of order.

What I claim as new is:

1. A spear for wells including a mandrel, a radial flange thereon, an expander cone on said mandrel supported on said flange, slips supported on said cone, a nut threaded on said mandrel below said flange, means to hold said nut non-rotatable relative to said cone, and means on said nut adapted to be screwed upwardly to engage and move said slips.

2. A spear for wells including a mandrel, a radial flange thereon, an expander cone on said mandrel supported on said flange, slips supported on said cone, a nut threaded on said mandrel below said flange, means to hold said nut non-rotatable relative to said cone, and means on said nut adapted to be screwed upwardly to engage and move said slips by the relative rotation of said mandrel, and means to engage the upper end of said slip to hold it inwardly.

3. A spear including a mandrel, an expander cone thereon, means on said mandrel to support said cone and hold it against longitudinal movement, a nut on said mandrel, a pipe gripping member on said mandrel adapted to be expanded radially by downward movement on said cone, and means on said nut adapted to engage said member and move it upwardly out of pipe engaging position.

4. A spear including a mandrel, an expander cone thereon, means on said mandrel to support said cone and hold it against longitudinal movement, a nut on said mandrel, a pipe gripping member on said mandrel adapted to be expanded radially by downward movement on said cone, an upward extension on said nut adapted to engage said member when said mandrel is screwed downwardly through said nut.

5. A spear including a mandrel, a supporting flange on said mandrel, a conical expander member on said flange, a skirt on said member extending below said flange, a nut screwed upon said mandrel below said flange, means on said nut securing said nut to said member slidably but non-rotatably, said nut being extended upwardly outside said skirt, a slip member on said expander and means on said nut positioned to engage said slip and move it upwardly on said mandrel.

6. A spear including a mandrel, a supporting flange on said mandrel, a conical expander member on said flange, a skirt on said member extending below said flange, a nut screwed upon said mandrel below said flange, means on said nut securing said nut to said member slidably but non-rotatably, a slip on said conical member, and means on said nut slidable relative to said member to engage and move said slip upwardly.

In testimony whereof I hereunto affix my signature this 3rd day of June, A. D 1931.

ERNEST WILKINSON.